(12) United States Patent
O'Donnell et al.

(10) Patent No.: US 9,315,993 B2
(45) Date of Patent: Apr. 19, 2016

(54) NON-STRUCTURAL MULTI-PART PANEL

(75) Inventors: John Bernard O'Donnell, Mt. Nathan (AU); Barry William Snowdon, Worongary (AU)

(73) Assignee: JB & DR O'Donnell Plasterers Pty Ltd, Mt. Nathan Queensland (AU)

( * ) Notice: Subject to any disclaimer, the term of this patent is extended or adjusted under 35 U.S.C. 154(b) by 1784 days.

(21) Appl. No.: 11/990,084

(22) PCT Filed: Aug. 10, 2006

(86) PCT No.: PCT/AU2006/001141
§ 371 (c)(1),
(2), (4) Date: Nov. 22, 2010

(87) PCT Pub. No.: WO2007/016746
PCT Pub. Date: Feb. 15, 2007

(65) Prior Publication Data
US 2011/0059289 A1   Mar. 10, 2011

(30) Foreign Application Priority Data

Aug. 10, 2005 (AU) .................... 2005904300

(51) Int. Cl.
| | | |
|---|---|---|
| *B32B 3/06* | (2006.01) | |
| *B32B 3/26* | (2006.01) | |
| *B32B 5/00* | (2006.01) | |
| *E04C 2/24* | (2006.01) | |
| *B32B 23/04* | (2006.01) | |
| *B32B 29/00* | (2006.01) | |
| *E04B 1/94* | (2006.01) | |

(52) U.S. Cl.
CPC ............ *E04C 2/246* (2013.01); *B32B 23/048* (2013.01); *B32B 29/00* (2013.01); *B32B 29/007* (2013.01); *E04B 1/942* (2013.01); *B32B 2250/02* (2013.01); *B32B 2266/0207* (2013.01); *B32B 2307/102* (2013.01); *B32B 2307/304* (2013.01); *B32B 2307/718* (2013.01); *B32B 2419/04* (2013.01); *B32B 2451/00* (2013.01); *B32B 2607/00* (2013.01); *Y10T 428/24008* (2015.01); *Y10T 428/249987* (2015.04)

(58) Field of Classification Search
USPC ......................................... 428/99, 318.4, 219
See application file for complete search history.

(56) References Cited

U.S. PATENT DOCUMENTS

| | | | |
|---|---|---|---|
| 4,973,506 A * | 11/1990 | Bauer et al. ............... 428/73 |
| 5,373,674 A | 12/1994 | Winter | |
| 5,633,063 A * | 5/1997 | Lause et al. ............... 428/71 |
| 5,743,056 A | 4/1998 | Balla-Goddard | |
| 6,044,604 A | 4/2000 | Clayton et al. | |
| 2002/0107315 A1* | 8/2002 | Chaudhary et al. .......... 524/371 |
| 2005/0000179 A1 | 1/2005 | Hornsby | |
| 2005/0202253 A1 | 9/2005 | Grafenauer | |
| 2006/0155039 A1* | 7/2006 | Alexander et al. ............ 524/449 |

FOREIGN PATENT DOCUMENTS

| | | |
|---|---|---|
| AU | 198543854 | 1/1986 |
| DE | 2844617 | 4/1980 |
| EP | 1561554 | 8/2005 |
| FR | 2308748 | 11/1976 |
| JP | 03-159733 | 7/1991 |
| JP | 08281853 | 10/1996 |
| WO | WO 93/21406 | 10/1993 |
| WO | WO 9321406 A1 * | 10/1993 |
| WO | WO 03/052214 | 6/2003 |

OTHER PUBLICATIONS

PCT Search Report for PCT/AU2006/001141. International Filing date Aug. 10, 2006.

* cited by examiner

*Primary Examiner* — Tahseen N Khan

(57) ABSTRACT

A non-structural multi-part panel including at least two layers, a first layer of foamed material and a second layer applied to at least one side of the first layer, the second layer of cellulosic material.

14 Claims, No Drawings

NON-STRUCTURAL MULTI-PART PANEL

FIELD OF THE INVENTION

The present invention relates to panels and in particular, to non-structural panels used to line elements of a building that assist with thermal and/or soundproofing the structure.

BACKGROUND ART

An excellent summary of prior art panel members is given in U.S. Pat. No. 6,698,149 and is repeated below verbatim:

"A number of different types of laminated building materials are known. Examples of some of the known laminated building materials are described in U.S. Pat. No. 4,078,348 to Rothman, U.S. Pat. No. 4,774,794 to Grieb, U.S. Pat. No. 4,973,506 to Bauer et al., U.S. Pat. No. 5,483,778 to Scrivener, and U.S. Pat. No. 6,235,367 to Holmes et al.

Grieb, U.S. Pat. No. 4,774,794 discloses a laminated building block made up of a foam core with a combined fiberglass and cementitious coating surrounding all sides of the core. The building blocks disclosed by Grieb are self-supporting and may be used in a load-bearing application, without a separate frame, to build structures such as homes and commercial buildings.

Bauer et al., U.S. Pat. No. 4,973,506, discloses a decorative composite plate for facing exterior building surfaces. The plate of Bauer et al. has a honeycomb core structure disposed between two cover layers. An outer cover layer carries a decorative panel, which may consist of stone, and the inner cover layer carries a protective plate.

A number of different types of skirting material are known for use with mobile homes. Examples of the known skirting materials include those disclosed in U.S. Pat. No. 3,753,323 to Nesbitt, U.S. Pat. No. 3,832,813 to Hindman, U.S. Pat. No. 4,680,904 to Stoecker, U.S. Pat. No. 4,843,793 to Ayers, and U.S. Pat. No. 6,205,720 to Wolfrum.

Although the known laminated building materials are useful for their intended purposes, a need still exists in the art for building materials that are useful for decorative exterior placement on buildings. In particular, there is a need for a relatively lightweight and low cost decorative building material that is easy to install, and that includes a durable material such as stone, tile or brick on an exterior surface thereof, for improving the appearance of buildings."

It is therefore known to use polyurethane or similar as a component of a panel but such panels are normally structural rather than decorative. None of these are specifically adapted to be used as a decorative panel with extreme lightness, thermal and soundproofing characteristics.

It will be clearly understood that, if a prior art publication is referred to herein, this reference does not constitute an admission that the publication forms part of the common general knowledge in the art in Australia or in any other country.

SUMMARY OF THE INVENTION

The present invention is directed to a non-structural multi-part panel, which may at least partially overcome at least one of the above-mentioned disadvantages or provide the consumer with a useful or commercial choice.

In one form, the invention resides in a non-structural multi-part panel including at least two layers, a first layer of foamed material and a second layer applied to at least one side of the first layer, the second layer of cellulosic material.

The panel of the present invention finds particular application as a decorative panel in finishing of internal walls and ceilings in buildings. The lightweight nature of the panel of the present invention manufactured, as it will typically be, of at least one layer of polyurethane material, will have a low thermal conductivity and also a low sound transmissivity providing a finishing panel with excellent thermal and sound proofing qualities.

Typically, the at least one first layer of the panel is made from a rigid blown polyurethane foam of which Type-141B blown rigid foam is a preferred type. This type of polyurethane foam generally has a density of between 55 and 150 kg/m$^3$. The polyurethane layer will generally have a thickness of 8 mm up to 50 mm, although it is to be appreciated that other thicknesses will also be manufactured where necessary. The density of the material used will depend on the type of material but typically, the density will be between 50 and 200 kg/m$^3$.

Generally the at least one polyurethane layer will be a central layer with a pair of second layers, one applied to each side of the central layer. The central layer will generally be a sheet member with a pair of planar faces. Normally, the second layers will be applied to the planar faces.

The second layers will typically both be a cellulosic layer, preferably of cellulose recycled paper. This may be accomplished using a machine specially manufactured for this purpose or through direct lamination of the second layers to the first in any manner.

Typically, each panel manufactured according to the invention may be manufactured with a tongue and groove or mortice and tennon provided at opposed lateral edges of the panel. This will preferably allow adjacent panels to be fitted together when being installed. This is particularly useful when using the panels as a finishing sheet for walls or ceilings inside a building.

The panel sheets of the invention may be manufactured of various sizes suited to buildings. Preferably, there will also be panel members manufactured in arcuate cross-sections and portions such as corner pieces to fit into internal or external corners between walls and ceilings and the like.

Preferably, due to the components used in manufacture and the manner in which they are used, the panel of the invention will be lightweight at approximately 2 kg/m$^2$ at a thickness of between 12 mm and 50 mm.

Other materials may be used to form the first central layer of the panel or shaped portion. One particular example is polyisocyanurate boardstock foam which is an energy efficient and cost-effective insulation material.

Type-141b is an ideal blowing agent for this application. Type-141b has a low vapor thermal conductivity that gives the polyurethane core blown with Type-141b good insulation value. Additionally, because Type-141b is generally a liquid at atmospheric conditions, it allows the foam system to be easily processed and gives good flow properties to the foam. Good flow properties allow the material to fill the panels uniformly.

However, Type-141b polyurethane foam has a major drawback in that it is a HCFC foam which has ozone-depleting properties and for this reason, manufacture of HCFC 141b for use in foam blowing in the United States ceased on 1 Jan. 2003 by order to the United States Environmental Protection Agency.

The polyurethane foam normally used as the first layer in the panel of the invention typically plays an important part in meeting required thermal or energy conductivity requirements. For this reason, two materials which have been developed as replacements for HCFC 141b may also find application as the material for the first layer of the panel of the invention, namely HFC-245fa and HFC-134a.

HFC-245fa is the leading candidate material to replace the CFC 141b due to its zero ozone depletion potential, relatively low thermal conductivity, non-flammability, low toxicity, good polyol compatibility, good masterbatch stability and compatibility with other materials.

HFC-134a is less preferred due to its more limited polyol compatibility and masterbatch solubility.

The vapor-thermal conductivities of both HFC-245fa and HFC-134a are significantly higher than that of HCFC-141b. Intuitively, one would expect the insulating properties of foams blown with either HFC to be worse than the corresponding properties of HCFC-141b blown foam. However, this is not the case with HFC-245fa blown foam.

HFC-245fa foam can deliver insulation performance equivalent to the HCFC-141b blown foams. HFC-134a blown foam insulation has yet to show this equivalency. This is primarily due to the solubility characteristics of HFC-134a in polyols.

In order to maintain a reasonable density, foam formulations employing HFC-134a as the physical blowing agent require higher levels of the chemical blowing agent water. Water reacts with the isocyanate portion of the polyurethane formulation to generate carbon dioxide gas. Higher concentrations of carbon-dioxide gas, which has a high vapor-thermal conductivity, result in a higher overall thermal conductivity for the resulting foam. Higher thermal conductivity translates to a less efficient insulation.

Although the k-factor of the HFC-245fa foam is higher than the HCFC-141b foam at a 75° F. mean sample temperature, the k-factor at a 35° F. mean sample temperature is significantly lower. Thus, an average insulating performance from HFC-245fa foam is generally equivalent to HCFC-141b foam. The HFC-134a blown foam's k-factor is higher than HCFC-141b foam at both temperatures.

HFC-245fa blown-foam processes much like the HCFC-141b blown foam. Although HFC-245fa boils below room temperature, its good solubility characteristics in polyols allows processing that is similar to familiar liquid-blowing agents used in the past. The molded density of HFC-245fa foams is also comparable to HCFC-141b foam.

HFC-134a is a low-boiling-point blowing agent that produces a strong frothing effect when poured. While HFC-134a processes under conditions similar to currently used blowing agents, the froth (which is similar to shaving cream in appearance) does not flow as well as a liquid. Generally, this frothing effect leads to higher moulded densities. Additionally, specialized equipment is needed to handle these blends because of the pressures involved in the use of HFC-134a.

Further, the panel of the invention may include materials which increase the fire barrier properties of the panel of the invention, normally referred to as passive fire protection. In this context the term "passive" means the use of materials that impart fire resistance. Passive fire protection systems are used extensively throughout the building and transportation industries and typically function by counteracting the movement of heat and/or smoke, by sealing holes, by prolonging stability of structures to which the system is applied and/or by creating thermal and/or physical barriers to the passage of fire, heat and smoke.

Typically, the passive fire protection of the present invention may be increased through the addition of fire resistant compositions to the materials used in the panel or as one or more separate layers to the panel itself. These compositions will preferably may form a physically strong coherent layer around the panel or a portion thereof. In particular, the presence of low levels of glass additive in fire resistant compositions comprising a silicone polymer and mica, has been found to the mechanical strength of a ceramic formed on heating the composition. In this context a ceramic is an inorganic non-metallic solid material prepared by high temperature processing (e.g. above about 300° C.)

For example, the central core layer may include a polymeric composition with fire resistant properties.

Preferably, the inner core of the panel or one or more layers of the panel may include a fire resistant composition comprising a silicone polymer; mica in an amount of from 5% to 30% by weight based on the total weight of the composition; and a limited amount of glass additive sufficient to enable the formation of a self supporting ceramic material at temperatures above the decomposition temperature of the silicone polymer and below the fire rating temperature of the composition.

Alternatively, the glass additive in the composition may be present in an amount of from 0.3% to 8% by weight based on the total weight of the composition. For the purposes of this discussion regarding the fire resistant composition, the composition is discussed as a separate formulation to the formulation of the material of the core of the panel and appropriate adjustments to the relative quantities of fire resistant composition and core material can be made by a person skilled in the art.

Still further, the fire resistant composition may comprise a polymer component consisting of a silicone polymer; mica in an amount of from 5% to 30% by weight based on the total weight of the composition; and a glass additive in an amount of from 0.3% to 8% by weight based on the total weight of the composition.

The glass additive is particularly effective at extending the range of temperatures that result in formation of ceramics with good mechanical properties, thereby improving the performance of these compositions in passive fire protection applications. It also improves the mechanical strength of the resulting ceramic relative to equivalent compositions without the glass additive. The type and mean particle size of the mica is typically selected based on the intended use of the composition, as described below.

The glass additive may take a variety of forms such as powder, particles or fibres. Mixtures of one or more of these may be used. Preferably, the composition comprises glass frits in the form of a powder or fine particles. Irrespective of form, the glass additive preferably has a softening point below 1050° C., for example below 800° C., and most preferably between 300 and 800° C. The softening point of a glass is defined by the temperature at which the viscosity of the glass equals $10^{7.6}$ poise.

The glass additive may be one or a combination of silicate, borate, phosphate and/or lead based glass systems. Suitable glass additives are commercially available.

Without wishing to be bound by theory, it is believed that compositions comprising a silicone polymer and from 5% to 30% weight of mica form a coherent ceramic product after exposure to elevated temperatures as a result of materials of lower melting point, which may be eutectic mixtures, forming at the interface of the mica particles and particles of inorganic compounds formed from the decomposition of the silicone polymer (primarily silicon dioxide). Ordinarily, silicon dioxide and mica each have melting points well above 1050° C. However, the eutectic that forms at the interface melts at a lower temperature. This eutectic material is believed to act as a "bridge" between the silicon dioxide particles and the mica particles, thereby solidifying the composition at the firing temperature. Upon cooling, a coherent ceramic product is formed and this has been found to be self supporting and able to withstand at least minor mechanical impacts or shocks.

It is thought that the presence of the glass additive in the silicone polymer/mica compositions results in a stronger ceramic material being formed if the composition of the invention is exposed to elevated temperature due to the glass softening or melting at a lower temperature than, and/or at a similar temperature to, that required for formation of the eutectic at the interface between the particles. This is thought to assist in "binding" the silicon dioxide and/or the mica particles together. In this way formation of a coherent ceramic product is improved and it is possible to reduce the temperature required to form a comparatively strong ceramic material. If the levels of glass additive are in the range of from 0.3 wt % to 8 wt %, the additive does not adversely affect dimensional stability.

In contrast, compositions having glass additives greater than 8% by weight experience sustained volume shrinkage when subjected to temperatures greater than 1000° C. For fire protection applications, it is preferable that this shrinkage is less than 10% and more preferably less than 5%. Hence, the amount of glass added is adjusted to ensure that the composition or articles formed from the composition comply with the desired volume shrinkage limits for a given application at the fire rating temperature.

The composition may be required to form a self supporting porous ceramic (typically having a porosity of between 40 vol % to 70 vol %) when exposed to fire rating temperatures, and in that case, it is important that the composition does not fuse. In the context of this discussion, "fuse" means that the liquid phase produced in the composition becomes a continuous phase, and/or that the mica particles largely lose their original morphology, and/or that the amount of liquid phase produced becomes sufficient to cause the ceramic to deform due to its own weight. The upper limit for the addition of the glass components is preferably 8% by weight to avoid fusing of the composition occurring below the upper temperature of the exposure. Thus in the resulting ceramic the mica particles essentially retain their morphology, with only minor changes at the edges as a result of 'bridging' to silicon dioxide particles or 'binding' with glass particles. Hence, compositions in accordance with the present invention yield a coherent ceramic product that has substantially the same shape and volume as the composition before it was exposed to elevated temperature. Such compositions can be described as retaining near net shape.

The softening point of the glass typically has an impact on the properties of the ceramic formed at elevated temperatures. Glasses with relatively low softening points provide enhanced mechanical strength at lower temperatures than glasses with relatively high softening points. The finer the particle size of the glass additive, the more effective it is at enhancing the mechanical strength of the resulting ceramic. A blend of glass additives having low and high softening points may be used to provide a composition which yields a ceramic on heating which develops good mechanical properties after exposure to a large range of temperatures.

The compositions of the present invention include as an essential component, a silicone polymer. The nature of the silicone polymer is not especially critical and: one skilled in the art will be aware as to the type of polymers which may be used. Useful silicone polymers are described in detail in the prior art including U.S. Pat. No. 4,184,995, U.S. Pat. No. 4,269,753, U.S. Pat. No. 4,269,757 and U.S. Pat. No. 6,387,518. By way of more specific illustration, the silicone polymer may be an organopolysiloxane composed of units of formula:

$$R_rSiO_{4-r/2}$$

in which
R may be identical or different and are unsubstituted or substituted hydrocarbon radicals, and r is 0, 1, 2 or 3 and has an average numerical value of from 1.9 to 2.1.

Examples of hydrocarbon radicals R are alkyl radicals, such as the methyl, ethyl, n-propyl, isopropyl, n-butyl, isobutyl, tert-butyl, n-pentyl, isopentyl, neopentyl, tert-pentyl and hexyl radicals, such as n-hexyl, heptyl radicals, such as the n-heptyl, octyl radicals, such as the n-octyl, and isooctyl radicals, such as the 2,2,4-trimethylpentyl, nonyl radicals, such as the n-nonyl, decyl radicals, such as the n-decyl, dodecyl radicals, such as the n-dodecyl, octadecyl radicals, such as the n-octadecyl; cycloalkyl radicals, such as cyclopentyl, cyclohexyl and cyclolheptyl and methyl cyclohexyl radicals; aryl radicals, such as the phenyl, biphenyl, napthyl and anthryl and phenanthryl; alkaryl radicals, such as o-, m- or p-tolyl radicals, xylyl and ethylphenyl radicals; and aralkyl radicals, such as benzyl and .alpha.- and .beta.-phenylethyl.

Examples of substituted hydrocarbon radicals R are halogenated alkyl radicals, such as 3-chloropropyl, the 3,3,3-trifluoropropyl and the perfluorohexylethyl and halogenated aryl, such as the p-chlorophenyl and the p-chlorobenzyl.

The radicals R are preferably hydrogen atoms or hydrocarbon radicals having from 1 to 8 carbon atoms, preferably methyl. Other examples of radicals R are vinyl, allyl, methallyl, 1-propenyl, 1-butenyl and 1-pentenyl, and 5-hexenyl, butadienyl, hexadienyl, cyclopentenyl, cyclopentadienyl, cyclohexenyl, ethynyl, propargyl and 1-propynyl. The radicals R are preferably alkenyl radicals having from 2 to 8 carbon atoms, particularly vinyl.

The end groups of the polymers may be trialkylsiloxy groups, for example trimethylsiloxy or dimethylvinylsiloxy groups, or derived groups where one or more of the alkyl groups has been replaced by hydroxy or alkoxy groups.

The composition may include one or more than one crosslinkable silicone polymer. The crosslinkable polymer can be any one which can be crosslinked by any one of the methods used for commercially available organopolysiloxane polymers including by free radical crosslinking with a peroxide through the formation of ethylenic bridges between chains, by addition reactions including reaction of silylhydride groups with allyl or vinyl groups attached to silicon, through condensation reactions including the reactions of silanols to yield Si—O—Si crosslinks, or using other reactive groups. Depending on the type of silicone polymer used the composition will therefore further comprise a suitable crosslinking agent. Suitable crosslinking agents are commercially available, for example there is a wide range of useful peroxides suitable for use in this application, such as dibenzoyl peroxide, bis(2,4-dichlorobenzoyl) peroxide, dicumyl peroxide or 2,5-bis(tert-butylporoxy)-2,5-dimethylhexene or also mixtures of these, and when appropriate they may be included in the composition during the compounding process.

The silicone polymers that can be used also include platinum catalysed liquid silicone polymers with unsaturated (typically vinyl) side chains that crosslink through the application of heat in an addition reaction. Such polymers are usually supplied as two components that are mixed together just prior to use. The viscosity of these polymers ranges from pourable liquids through to stiff pastes. The silicone rubber compositions may also comprise a room temperature moisture-curable organopolysiloxane (RTV), for which an example is given in more detail in U.S. Pat. No. 5,023,295. In this case it comprises: (a) a diorganopolysiloxane having terminal hydroxyl groups, (b) crosslinking agent having an average of at least 3 hydrolysable functional groups linked to a silicone atom per molecule, (c) a condensation catalyst, and (d) a platinum metal or compound. Other room temperature curing systems possessing alkyl silicate and metal salts of carboxylic acids as one part which is combined with the silanol end stopped diorganopolysiloxane and inert filler as the other part, as for example described in U.S. Pat. No. 4,184,995 will also be included.

Another type is where the silicone polymer is of high molecular weight and has vinyl side chains that require heat to crosslink, either through platinum catalysed addition reactions or peroxide initiated free radical reactions. These silicone polymers are widely available commercially from major silicone producers.

The organopolysiloxane raw materials preferably also comprise reinforcing fillers such as precipitated or pyrogenic silicas and/or non-reinforcing fillers. Further, the surface of these silica type fillers may be modified by straight or branched organopolysiloxanes, organo-chlorosilanes and/or hexamethyl disilazanes.

The compositions include mica. The two most common classes of commercially available mica are muscovite and phlogopite. Muscovite mica is a dioctahedral alkali aluminium silicate. Muscovite has a layered structure of aluminium silicate sheets weakly bonded together by layers of potassium ions. It has the following composition $KAl_3Si_3O_{10}(OH)_2$. Phlogopite mica is a trioctahedral alkali aluminium silicate. Phlogopite has a layered structure of magnesium aluminium silicate sheets weakly bonded together by layers of potassium ions. It has the following composition $KMg_3AlSi_3O_{10}(OH)_2$. Both mica types are typically present in the form of thin plates or flakes having sharply defined edges.

Compositions containing phlogopite mica display greater mechanical strength when heated to about 1000° C. to form ceramics. However, they also show greater shrinkage than those containing muscovite mica. The use of muscovite mica is preferred in applications where greater dimensional stability is required.

Commercially available grades of mica have a range of particle size distributions. It has been found that the particle size of the mica has an important effect on the dimensional stability and mechanical properties of the ceramic product formed when a composition of the present invention is exposed to elevated temperature. Typically, the mica is selected so that it has a mean particle size of from 15 µm to 250 µm. Micas at the lower end of this range (e.g. less than 50 µm mean particle size) result in ceramics that are mechanically stronger but display greater shrinkage that can result in cracking. Micas at the middle and upper end of the range are preferable for use in cable applications or other applications where shape retention is particularly important. If the mean particle size of the mica is too large or the amount of mica present is too high, the resultant composition tends to be difficult to process and form into the desired configuration, for instance by extrusion. In addition, the mechanical properties of crosslinked silicone polymers containing coarser particle size grades of mica or high mica levels are poorer. The coarser mica particles tend to produce preferential alignments along their crystallographic basal planes when the compositions are extruded, or molded under compression, and this can result in low tear strength.

The mica may be surface treated with a silane coupling agent in order to enhance the mechanical properties before and/or after firing. Examples of silane coupling agents are vinyltrimethoxysilane, aromatic silane, aryl silane, epoxysilane, acrylsilane, polymeric silane and mercaptosilanes such as mercaptopropyltrimethoxysilane. The silane coupling agent is preferably present in the range of from 0.05% to 2% by weight of the composition.

The selection of the appropriate mica type, mean particle size and mica level will depend on the intended application, the required processing properties of the composition, the required mechanical properties of the crosslinked composition, and the required strength and extent of dimension retention required when converted to the resulting ceramic. The properties which these compositions are desired to exhibit when exposed to the range of elevated temperatures commonly associated with a fire may be manipulated by suitable choice of the type and particle size of the mica which is used. In other words, the properties of these compositions may be tailored to the intended end use.

Preferably, the mica addition is from 5% to 30% by weight based on the total weight of the composition. Muscovite mica is the type generally preferred for those applications, but greater mechanical strength after firing at 1000° C. can be obtained using phlogopite mica.

Other components may be incorporated into the compositions of the present invention. The addition of zinc borate, magnesium hydroxide or alumina trihydrate, improves the flame retardant properties of the composition. Additionally, some may improve the strength of the ceramic. Other components include inorganic fibres or other fibre reinforcing materials, materials that reduce thermal conductivity (eg exfoliated vermiculite), chemical foaming agents (which serve to reduce density, improve thermal characteristics and further enhance noise attenuation), extending non-reactive fillers, silica, and intumescing materials (to obtain a composition that expands upon exposure to fire or elevated temperature). Suitable intumescing materials include natural graphite, unexpanded vermiculite or unexpanded perlite. Other types of intumescing precursors may also be used.

The compositions may be prepared by blending and heating the various components. Heating is required for peroxide crosslinking of the silicone polymer to form a silicone elastomer. Any conventional compounding equipment may be used. If the composition has relatively low viscosity, it may be processed using dispersing equipment, for instance of the type used in the paint industry. Materials useful for cable insulation applications are of higher viscosity (higher molecular weight) and may be processed using a two roll mill, internal mixers, twin-screw extruders and the like. Depending upon the type of crosslinking agent/catalyst added, the composition can be cured by exposure to air at 200° C., in an autoclave with high pressure steam, using continuous vulcanisation equipment including a liquid salt bath and, conceivably, by exposure to any medium that will cause the peroxide to decompose, including microwaves, ultrasonic waves or the like.

DETAILED DESCRIPTION OF THE PREFERRED EMBODIMENT

A particularly preferred embodiment of the present invention is a non-structural or decorative multi-part finishing panel which includes at least three layers. The three layers are an inner layer or central core of foamed material and an outer layer applied to both sides of the inner layer of cellulosic or paper material.

The panel of the present invention finds particular application as a decorative panel in finishing of internal walls and ceilings in buildings. The lightweight nature of the panel of the present invention manufactured, as it will typically be, of at least one layer of polyurethane material, will have a low thermal conductivity and also a low sound transmissivity providing a finishing panel with excellent thermal and sound proofing qualities.

The central core layer of the panel is made from a rigid blown polyurethane foam, of which Type-141B blown rigid foam is a preferred type. This type of polyurethane foam generally has a density of between 55 and 95 kg/m³. The polyurethane layer has a thickness of 12 mm up to 50 mm, although it is to be appreciated that other thicknesses will also be manufactured where necessary.

The central layer is provided as a sheet member with a pair of planar faces and the outer layers are applied to the planar faces.

Each panel manufactured according to the invention is manufactured with a key style attachment system located at the edges of the panel. The key style attachment system usually has a tongue and a groove provided at opposed lateral edges of the panel. This allows adjacent panels to be fitted together when being installed. This is particularly useful when using the panels as a finishing sheet for walls or ceilings inside a building.

The panel sheets of the invention may be manufactured of various sizes suited to buildings. There are also panel members manufactured in arcuate cross-sections and portions such as corner pieces to fit into internal or external corners between walls and ceilings and the like.

Due to the components used in manufacture and the manner in which they are used, the panel of the invention is lightweight at approximately 2 kg/m² at a thickness of between 12 mm and 50 mm.

The polyurethane used in according to the preferred embodiment has the following properties:

| Properties | HCFC-141b |
| --- | --- |
| In-place Density (pcf) | 3.5-6.0 |
| Thermal Conductivity @75° F. (Btu-In/ft² hr ° F.) | 0.127 |
| Thermal Conductivity @50° F. (Btu-In/ft² hr ° F.) | 0.120 |
| Flow Min. Fill Weight (gm) | 295 |
| Parallel Compressive Strength (psi) | 20 |
| Perpendicular Compressive Strength (psi) | 17 |
| Freeze Stable Density (lbs/ft³) | 1.85 |
| Dimensional Stability @ −13° F. % volume change during 14 days | −0.75 |
| Dimensional Stability @ 158° F. & 97% RH % volume change during 14 days | 3.1 |
| Dimensional Stability @ 199° F. % volume change during 14 days | 3.8 |
| Type-141b Foam Formulation Characteristics | |
| % Blowing agent on Total Foam | 11.5 |
| % CO₂ blowing of blowing mixture | 25 |
| % Physical blowing agent blowing of blowing mixture | 75 |
| Free rise density (pcf) | 1.4 |
| Vapour pressure (psia) | 3 |

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

The invention claimed is:

1. A decorative, non-structural multi-part panel having at least two decorative, non-structural layers, a first of said at least two decorative, non-structural layers being formed from a polymeric, blown rigid foam material with a density of between 55 and 150 kg/m³ and a second of said at least two decorative, non-structural layers being applied to at least one side of the first layer, the second layer being formed of cellulosic material and wherein the first layer of the said decorative panel includes a fire resistant composition comprising a silicone polymer, along with mica in a an amount of from 5% to 30% by weight based on the total weight of the composition, and a limited amount of glass additive sufficient to enable the formation of a self supporting ceramic material at room temperatures above the decomposition temperature of the silicone polymer and below the fire rating temperature of the composition wherein the panel has a weight to area ratio of approximately 2 kg/m² at a thickness of between 12 mm and 50 mm.

2. The panel according to claim 1 including at least one layer of polyisocyanate material.

3. The panel according to claim 1 wherein the first layer of the panel is made from Type-141B blown rigid foam.

4. The panel according to claim 1 wherein the first layer has a thickness of between 8 mm and 50 mm.

5. The panel according to claim 1 further including a mortice and tennon attachment system provided at opposed lateral edges of the decorative, non-structural panel.

6. The panel according to claim 1 wherein the foamed material of the first layer has a parallel compression strength of 20 psi and a perpendicular compression strength of 17 psi.

7. The panel according to claim 1 wherein the material the first layer is chosen from either HFC-245fa or HFC-134a.

8. The panel according to claim 1 further including materials which increase the fire barrier properties of the panel by prolonging stability of structures to which the materials are applied and/or by creating thermal and/or physical barriers to the passage of fire, heat and smoke.

9. The panel according to claim 1 wherein the glass additive in the composition is present in an amount of from 0.3% to 8% by weight based on the total weight of the composition.

10. The panel according to claim 1 wherein the silicone polymer includes an organopolysiloxane composed of units of formula:

$$R_rSiO_{4-r/2}$$

in which R represents an unsubstituted or substituted hydrocarbon radical, and r is in the range of 0 to 3.

11. The panel according to claim 1 wherein the composition contains phlogopite mica.

12. The panel according to claim 1 wherein the composition contains muscovite mica.

13. The panel according to claim 1 wherein the first layer is a central layer with a pair of second layers, one applied to each side of the central layer.

14. The panel according to claim 13 wherein each second layer is a cellulosic layer laminated to the first layer.

* * * * *